Figure 1:

United States Patent [19]

Clifford et al.

[11] Patent Number: 4,898,619
[45] Date of Patent: Feb. 6, 1990

[54] PIGMENT COMPOSITIONS

[75] Inventors: John F. Clifford, Buckinghamshire; Fiona C. R. Morrison, Cheshire, both of United Kingdom

[73] Assignee: Cookson Group PLC, United Kingdom

[21] Appl. No.: 286,142

[22] Filed: Dec. 19, 1988

[30] Foreign Application Priority Data

Dec. 21, 1987 [GB] United Kingdom ................. 8729729

[51] Int. Cl.⁴ .............................................. C09C 1/22
[52] U.S. Cl. .................... 106/459; 423/594; 423/633
[58] Field of Search ................. 106/459; 423/594, 633

[56] References Cited

U.S. PATENT DOCUMENTS

| | | | |
|---|---|---|---|
| 4,202,775 | 10/1987 | Ostertag | 106/459 |
| 4,373,963 | 2/1983 | Venishi et al. | 106/459 |
| 4,780,140 | 10/1988 | Franz et al. | 106/459 |
| 4,826,537 | 5/1989 | Ostertag | 106/459 |

FOREIGN PATENT DOCUMENTS 57-49667  3/1982  Japan .................................. 106/459

Primary Examiner—Theodore Morris
Attorney, Agent, or Firm—Watson, Cole, Grindle & Watson

[57] ABSTRACT

A pigment which comprises crystallites of iron oxide having an average particle size of less than 100 nanometers doped with from 10% to 80% by weight of aluminium as $Al^{3+}$ based on the weight of iron, having the general formula $(Al_xFe_{2-x})O_3$, where $x=0.34$ to $1.24$ and having an orange color with the following color measurements:

L (Lightness) > 45°
C (Strength) > 40°
H (Hue) 50° to 60°

A pigment precursor composition is also provided which, on firing, produces the pigment as defined above.

19 Claims, 1 Drawing Sheet

PIGMENT COMPOSITIONS

The present invention relates to a pigment composition and, in particular, to a pigment which has an orange colour.

Certain naturally occurring orange pigments are known, such as Thiviers Earth Synthetic orange pigments exist but they are either unstable at high temperatures, or expensive.

EP-B-0068311 discloses flaky pigments based on iron oxide of the formula $Al_xFe_{2-x}O_3$, in which x is in the range of from 0.02 to 0.5. These pigments flakes may be scaly, hexagonal or tabular but they are always characterized by having a high diameter to thickness ratio. Typical flakes have diameters of 2-12 micrometers and thickness of 0.1 to 0.5 micrometers. The flaky pigments possess colours ranging from copper through red to violet. The pigments are prepared by treating an aqueous suspension containing ferric hydroxide or ferric oxide hydrate hydrothermally in the presence of an alkali metal hydroxide and/or carbonate and of a dissolved alkali metal aluminate.

US-A-4291010 discloses a synthetic yellow iron oxide covered with (FeAl)OOH solid solution. This pigment has an elevated resistance to heat of about 50° C.

We have now developed an orange pigment which is based on an iron aluminium complex oxide and which has qualities which are as good as the naturally occurring pigment, Thivier's Earth, and a method for the manufacture thereof.

Accordingly, the present invention provides a pigment precursor composition which comprises crystallites of an iron aluminium oxyhydroxide complex having an average particle size of less than 100 nanometers and containing from 10% to 80% by weight of aluminium as $Al^{3+}$ based on the weight of iron.

The term an "orange" pigment is intended herein to refer to a pigment which has the following colour measurements carried out using any standard colour measurement instrument:

L (Lightness) >45°
C (Strength) ) >40°
H (Hue) 50° to 60°

The pigment precursor composition of the present is an iron aluminium oxyhydroxide complex in the form of crystallites having an average particle size of less than 100 nanometers, preferably an average particle size of less than 75 nanometers. The aluminium is included in an amount greater than 10% by weight based on the weight of iron, preferably from 60 to 80% by weight.

It is preferred that the pigment precursor composition includes therein a white burning carrier material onto which the iron aluminium complex is precipitated during its preparation and when such a substrate is included the precursor composition preferably contains 60% to 80% by weight of $Al^{3+}$ based on the weight of iron.

Suitable carrier materials include the white burning clays, such as china clay, silica or alumina.

Preferably the aluminium as dopant is present in the form of aluminium oxyhydroxide.

The pigment precursor composition of the present invention, on firing to a temperature in the range of from 700° to 1200° C., develops an orange colour with the following colour measurements:

L (Lightness) ) >45°
C (Strength) ) >40°
H (Hue) 50° to 60°

On firing at these temperatures the iron aluminium complex crystallites are transformed into iron oxide crystallites doped with $Al^{3+}$ The present invention thus includes within its scope a pigment which comprises crystallites of iron oxide having an average particle size of less than 100 nanometers doped with from 10% to 80% by weight based on the iron of aluminium as $Al^{3+}$, having the general formula $(Al_xFe_{2-x})O_3$ where x=0.34-1.24, preferably 1.10 to 1.24, and having an orange colour with the following colour measurements:

L (Lightness) >45°
C (Strength) ) >40°
H (Hue) 50° to 60°

The orange pigment of the present invention has a good refire stability up to 1150° C. and retains its orange colour at high temperatures.

The present invention also includes within its scope a method for the preparation of a pigment precursor composition as hereinbefore defined, which method comprises, forming an aqueous solution containing aluminium ($Al^{3+}$) cations and iron ($Fe^{3+}$) cations, optionally in the presence of a white burning carrier material, and raising the pH of the aqueous solution to above pH 1.5 in order to precipitate iron oxyhydroxide doped with $Al^{3+}$ cations therefrom.

Whilst the solution containing $Al^{3+}$ and $Fe^{3+}$ may be formed either by adding aluminium ($Al^{3+}$) to the iron ($Fe^{3+}$) solution or vice versa, the first option specified is preferred.

The pH of the resulting solution may be adjusted by any appropriate means, for example by the addition of an organic base such as ethanolamine or an alkali metal hydroxide, such as potassium hydroxide, thereto. The pH is preferably raised to within the range of from 1.5 to 6.5, preferably 4.0 to 6.5.

The solution containing $Fe^{3+}$ and $Al^{3+}$ cations is optionally admixed with a white burning carrier material of the type as hereinbefore specified.

The iron ($Fe^{3+}$) cations may be provided by any salt containing the iron in this oxidation state. Examples of suitable salts are ferric chloride, $FeCl_3 \cdot 6H_2O$, ferric sulphate, $Fe_2(SO_4)_3 \cdot 9H_2O$ and ferric acetate.

The aluminium ($Al^{3+}$) cations may be provided by any salt which contains the aluminium in this oxidation state. Examples of suitable salts are aluminium sulphate, $Al_2(SO_4)_3 \cdot 16H_2O$, aluminium chloride, $AlCl_3 \cdot 6H_2O$ and aluminium acetate.

On raising the pH of the mixed solutions a precipitate of an iron aluminium complex is formed. When a white burning carrier material is dispersed in the solution containing the $Fe^{3+}$ and $Al^{3+}$ cations the iron aluminium complex is deposited as a precipitate onto this white burning carrier material.

The precipitate is then filtered from the suspension and the filter cake dried, preferably in air. The filter cake may then be ground or ball milled, if desired. The crushed filter cake is then fired at a temperature in the range of from 700° to 1200° C. and the pigment composition develops an orange colour as hereinbefore specified. On firing at these temperatures the iron aluminium complex is transformed into iron oxide crystallites doped with $Al^{3+}$.

Alternatively, the pigment precursor composition of the present invention may be used as a slurry coating composition, or after drying in air as a coating material, for example to coat bricks. On firing the bricks the pigment composition develops an orange colour as hereinbefore specified. During the firing of the bricks the iron aluminium complex is transformed into iron oxide crystallites doped with $Al^{3+}$.

The present invention will be further described with reference to the following Examples.

In these Examples the colour measurements were carried out using the following technique.

COLOUR MEASUREMENT

A sample of material weighing approximately 6 g was obtained using standard sampling techniques and loaded into the powder cell of a conventional colour measurement instrument. The cell was tapped gently and the visible surfaces checked to ensure that the surface was smooth and even without cracks. The colour measurement instrument was calibrated with both a standard black and a standard white tile. The ultraviolet and specular components of the light source were then excluded and the colour measurements made on the sample. The colour measurements were repeated twice and the average figures for the L (Lightness), C (Strength) and H (Hue) values taken. The powder cell was then cleaned with acetone before the introduction of a new sample therein. The particular instrument used for the colour measurements was a Micromatch 2000 instrument from ICS Instrumental Colour Systems.

EXAMPLE 1

Ferric chloride (7.12 g) was dissolved in 378 ml of deionised water and aluminium sulphate (7.00 g) was dissolved therein with stirring. Kaolin light (12.00 g) was added to the solution to form a suspension and the suspension stirred Aminoethanolamine (3.2 ml) was added slowly to the suspension with continuous stirring to raise the pH to above 4. The suspension was filtered and the filter cake air dried at a temperature below 200° C. The filter cake was then crushed and ground until it passed through a 250 micrometer mesh sieve. The crushed and ground filter cake was fired at 1050° C. for two hours. This resulted in a pigment having the following colour measurement values
L=49.18
C=41.73
H=54.28

EXAMPLE 2

The general procedure of Example 1 was repeated except that 1.03 g of aluminium acetate replaced the aluminium sulphate, 9 g of kaolin light was added to the solution to form a suspension and the pH of the suspension was raised to above pH 4 by the addition of 140 ml of a 1M solution of potassium hydroxide. The product fired at 1050° C. had the following colour measurement values
L=56.27
C=41.00
H=53.26

EXAMPLES 3 to 12

The general procedure of Example 1 was repeated for these experiments. The various ingredients used in these experiments are abbreviated in Table 1 which follows in the following way
FC=Ferric chloride
FS=Ferric sulphate
AC=Aluminium chloride
AS=Aluminium sulphate
AA=Aluminium acetate
AEEA=Aminoethylethanolamine.

Unless otherwise stated all of these experiments were based upon the use of
378 ml Deionised water
9 g Kaolin light
and firing was for a 2 hour period at the temperature stated.

TABLE 1

| Ex. No. | FC (a) | FS (g) | AC (g) | AS (g) | AA (g) | KOH (ml) | Firing Temp. °C. | Colour Measurements L | C | H |
|---|---|---|---|---|---|---|---|---|---|---|
| 3 | | 5.26 | 5.35 | | | 87 | 1050 | 60.59 | 43.79 | 56.29 |
| 4 | | 5.26 | | 7.00 | | 70 | 1050 | 54.86 | 42.55 | 53.92 |
| 5 | | 5.26 | | | 1.26 | 65 | 1050 | 59.57 | 42.32 | 54.63 |
| 6[1] | 7.12 | | | 7.00 | | 130 | 1050 | 59.38 | 46.11 | 55.95 |
| 7[2] | 7.12 | | | 7.00 | | 118 | 1050 | 55.89 | 41.53 | 53.30 |
| 8[3] | 7.12 | | | 7.00 | | 81 | 1050 | 51.83 | 44.21 | 53.64 |
| 9 | 7.12 | | | 2.33 | | 77 | 1050 | 57.70 | 41.75 | 55.96 |
| 10 | 7.12 | | | 4.66 | | 76 | 1050 | 56.58 | 40.76 | 54.74 |
| 11 | 7.12 | | | 7.00 | | 90 | 700 (1 hour) | 53.14 | 42.32 | 53.25 |
| 12 | 7.12 | | | 7.00 | | 90 | 900 (1 hour) | 54.08 | 43.23 | 53.38 |

Footnotes
[1] = 190 ml of deionised water only
[2] = 95 ml of deionised water only
[3] = 6 g of kaolin light only For comparative purposes two samples of Thivier's Earth were obtained and colour measurements made. The following measurements were obtained

| | L | C | H |
|---|---|---|---|
| Thivier's Earth Sample 1 | 48.59 | 51.11 | 50.68 |
| Thivier's Earth Sample 2 | 41.02 | 43.78 | 47.17 |

EXAMPLE 13

The procedure of Example 6 was generally repeated and photomicrographs of the pigment obtained thereby taken.

Figure 2:
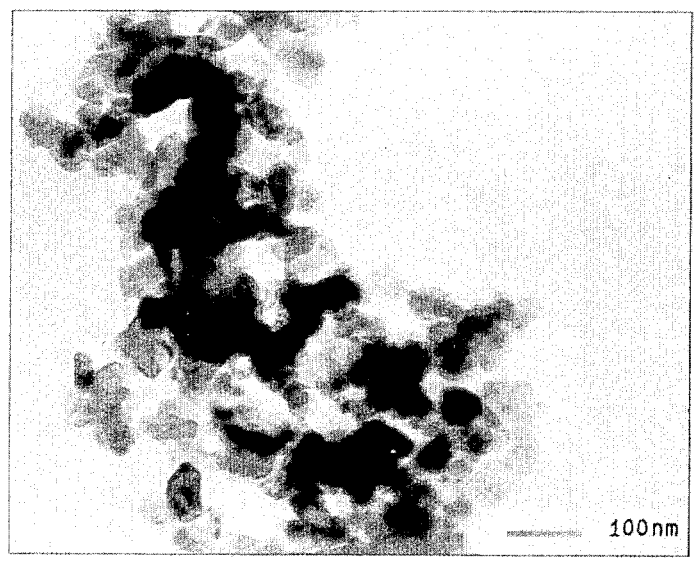

FIG. 1 shows the micrograph of iron aluminium oxide crystallites coating the clay particles, whilst FIG. 2 shows the micrograph of the same product at a higher magnification showing the crystallite size.

We claim:
1. A pigment precursor composition which consists essentially of crystallites of an iron aluminium oxyhydroxide complex having an average particle size of less than 100 nanometres and containing from 10% to 80% by weight of aluminium as $Al^{3+}$ based on the iron.

2. A pigment precursor composition according to claim 1 which contains from 60 to 80% by weight of aluminium as $Al^{3+}$.

3. A pigment precursor composition according to claim 1 which includes therein a white burning carrier material.

4. A pigment precursor composition according to claim 3 wherein the carrier material is selected from the group consisting of a white burning clay, silica and alumina.

5. A pigment precursor composition according to claim 1 wherein the crystallites of the iron aluminium complex have an average particle size of less than 75 nanometers.

6. A pigment precursor composition according to claim 1 which is in the form of a dry powder.

7. A pigment which consists essentially of crystallites of iron oxide having an average particle size of less than 100 nanometers doped with from 10% to 80% by weight of aluminium as $Al^{3+}$ based on the weight of iron, having the general formula $(Al_xFe_{2-x})O_3$, where $x = 0.34$ to $1.24$ and having an orange colour with the following colour measurements:
L (Lightness) >45°
C (Strength) >40°
H (Hue) 50° to 60°

8. A pigment according to claim 7 which is doped with from 60 to 80% by weight of aluminium as $Al^{3+}$ and has the general formula $(Al_xFe_{2-x}O_3$, where $x = 1.10$ to $1.24$.

9. A pigment according to claim 7 which includes therein a white burning carrier material.

10. A pigment according to claim 9 wherein the carrier material is selected from the group consisting of a white burning clay, silica and alumina.

11. A pigment according to claim 7 wherein the crystallites of iron oxide have an average particle size of less than 75 nanometers.

12. A pigment according to claim 7 wherein the aluminium as dopant is present as aluminium oxide.

13. A method for the preparation of a pigment precursor composition according to claim 1, which method comprises, forming an aqueous solution containing aluminium ($Al^{3+}$) cations and iron ($Fe^{3+}$) cations, optionally in the presence of a white burning carrier material, and raising the pH of the aqueous solution to above pH 1.5 in order to precipitate an iron aluminium complex therefrom.

14. A method according to claim 13 wherein a solution containing aluminium ($Al^{3+}$) cations is added to a solution containing iron ($Fe^{3+}$) cations.

15. A method according to claim 13 wherein the pH of the solution containing $Al^{3+}$ and $Fe^{3+}$ cations is adjusted by the addition of a base selected from the group consisting of an organic base and an alkali metal hydroxide thereto.

16. A method according to claim 13 wherein the pH of the mixture is raised to a pH in the range of from 1.5 to 6.5.

17. A method according to claim 13 wherein the $Fe^{3+}$ cations are provide by a ferric salt selected from the group consisting of ferric chloride, ferric sulphate and ferric acetate and the $Al^{3+}$ cations are provided by an aluminium salt selected from the group consisting of aluminium chloride, aluminium sulphate and aluminium acetate.

18. A method according to claim 13 wherein the precipitate is separated from the suspension and dried in air at a temperature below 200° C.

19. A method for the preparation of a pigment according to claim 7 which comprises firing a pigment precursor composition according to claim 1 at a temperature in the range of from 700° to 1200° C. to provide an orange pigment with the following colour measurements:
L (Lightness) >45°
C (Strength) >40°
H (Hue) 50° to 60°.

* * * * *